United States Patent [19]
Nyström

[11] Patent Number: 5,368,119
[45] Date of Patent: Nov. 29, 1994

[54] CABIN, ESPECIALLY FOR A CROSS-COUNTRY VEHICLE

[75] Inventor: Sten Nyström, Mala, Sweden
[73] Assignee: Mala Skogstjanst AB, Malå, Sweden
[21] Appl. No.: 978,677
[22] PCT Filed: Aug. 22, 1991
[86] PCT No.: PCT/SE91/00556
§ 371 Date: Apr. 22, 1993
§ 102(e) Date: Apr. 22, 1993
[87] PCT Pub. No.: WO92/04224
PCT Pub. Date: Mar. 19, 1992

[30] Foreign Application Priority Data
Aug. 30, 1990 [SE] Sweden .............. 9002771

[51] Int. Cl.$^5$ ............................. B62D 33/067
[52] U.S. Cl. ................ 180/89.14; 180/89.13; 180/89.16
[58] Field of Search ........... 180/89.12, 89.13, 89.14, 180/89.16, 89.15; 212/165, 206; 182/2

[56] References Cited
U.S. PATENT DOCUMENTS 3,690,720  9/1972  Whisler ................. 296/28 C
4,235,470  11/1980 Kauss et al. ............ 180/89.12
4,265,328  5/1981  Rowa et al. ............ 180/89.13

FOREIGN PATENT DOCUMENTS 2113615  9/1972  Germany .
2515458  10/1975 Germany .
3000606  7/1981  Germany ............. 180/89.12
3128284  2/1983  Germany .
417934   4/1981  Sweden .
8200443  1/1982  Sweden .
8304292  10/1987 Sweden ............. B62D 33/06
558301   1/1975  Switzerland .......... 182/2
1421675  9/1988  U.S.S.R. ............. 212/206

*Primary Examiner*—Eric D. Culbreth
*Attorney, Agent, or Firm*—Cushman, Darby & Cushman

[57] ABSTRACT

A cabin intended primarily for cross-country vehicles and supported at the top thereof by a carrier frame mounted on the vehicle. The cabin is freely suspended from the carrier frame by means of a carrier device which is so located in relation to a vertical line which passes through the center of gravity of the cabin that the cabin will always be located essentially in the horizontal plane, i.e., so that the center of gravity of the cabin lies on a straight line connecting the cabin suspension point and the center of the earth. The cabin is also connected to the carrier frame by means of shock absorbers which are spaced from the carrier device.

5 Claims, 3 Drawing Sheets

CABIN, ESPECIALLY FOR A CROSS-COUNTRY VEHICLE

BACKGROUND OF THE INVENTION

The present invention relates to a cabin intended primarily for a cross-country vehicle, and particularly to such a cabin that is hangingly suspended from above, and damped against uncontrolled swinging from its support.

The operator cabins of cross-country vehicles, such as forest tractors and forest harvesters, are affixed to the vehicle chassis and therewith accompany all of the movements performed by the vehicle in the terrain. These movements may have large amplitudes and powerful accelerations and retardations, in lateral, forward and rearward directions. This often makes the work of the driver very difficult and highly strenuous, since in addition to manoeuvring the vehicle, he or she must also remain firmly seated in the driver's seat.

In order to solve this problem and therewith provide improved working conditions for the driver of the vehicle concerned, endeavours have been made to support the driving seats on gyro suspensions, to manoeuvre the cabins hydraulically from beneath, and to incorporate different types of hydraulically operable axle pendulating systems for adjusting the vehicle wheels in relation to the chassis. Examples of these proposed solutions are found described in SE-8200443-3 and SE-304292-9. These known systems are complicated and expensive.

SUMMARY OF THE INVENTION

There is provided, according to the present invention, a vehicle, especially a cross-country vehicle having a driver's cabin which is hangingly supported from above, so as to tend to provide the driver with a stable horizon. Tendency of the suspended cabin to controllably oscillate about its support is damped by use of shock absorbers.

BRIEF DESCRIPTION OF THE DRAWINGS

The present invention will now be described in more detail with reference to an exemplifying embodiment thereof and with reference to the accompanying drawings, in which.

DETAILED DESCRIPTION

Figure 2:
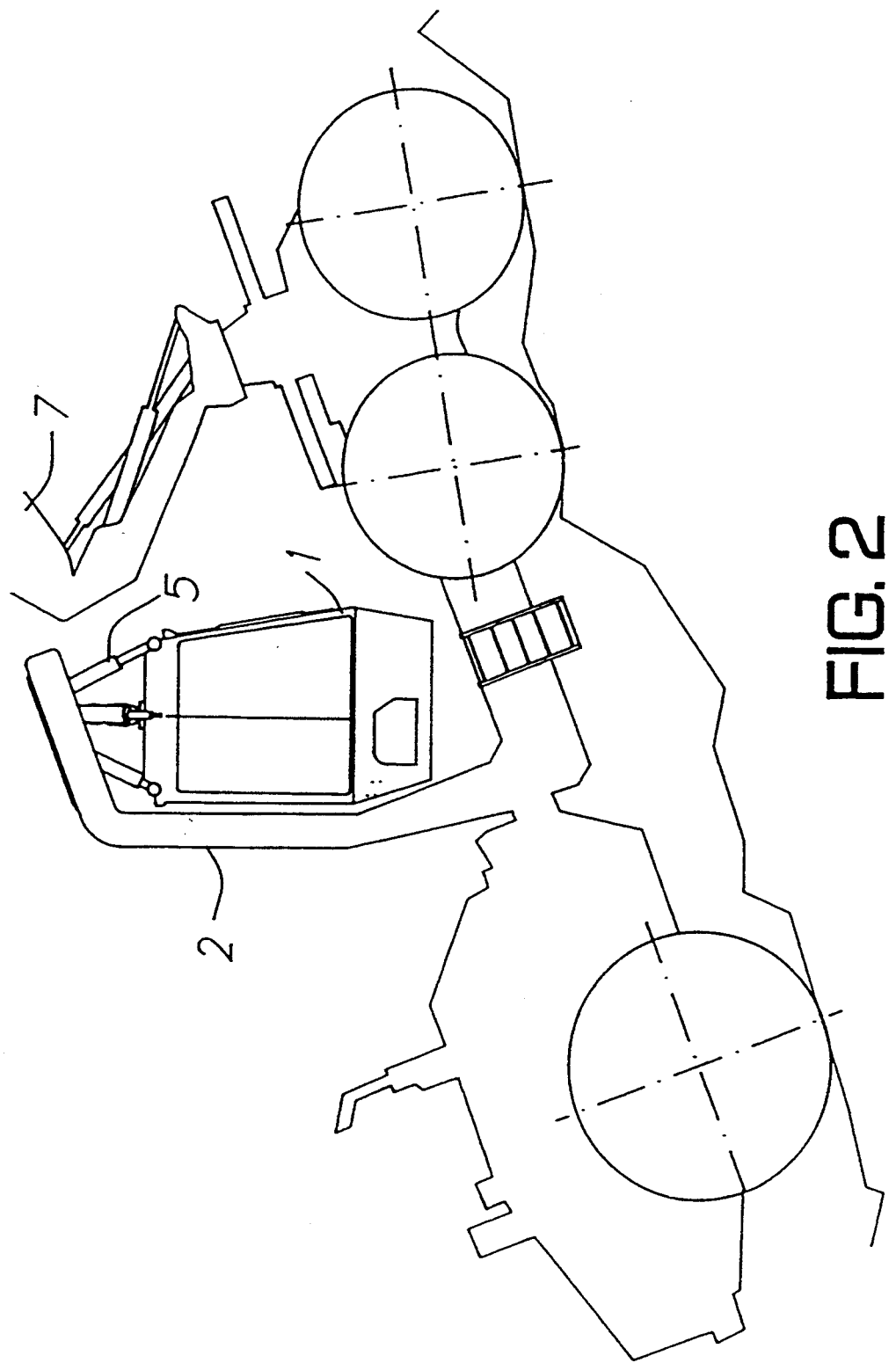
FIG. 2 illustrates the cabin mounted on the harvester, which in the illustrated example is inclined in the longitudinal plane.
Figure 3:
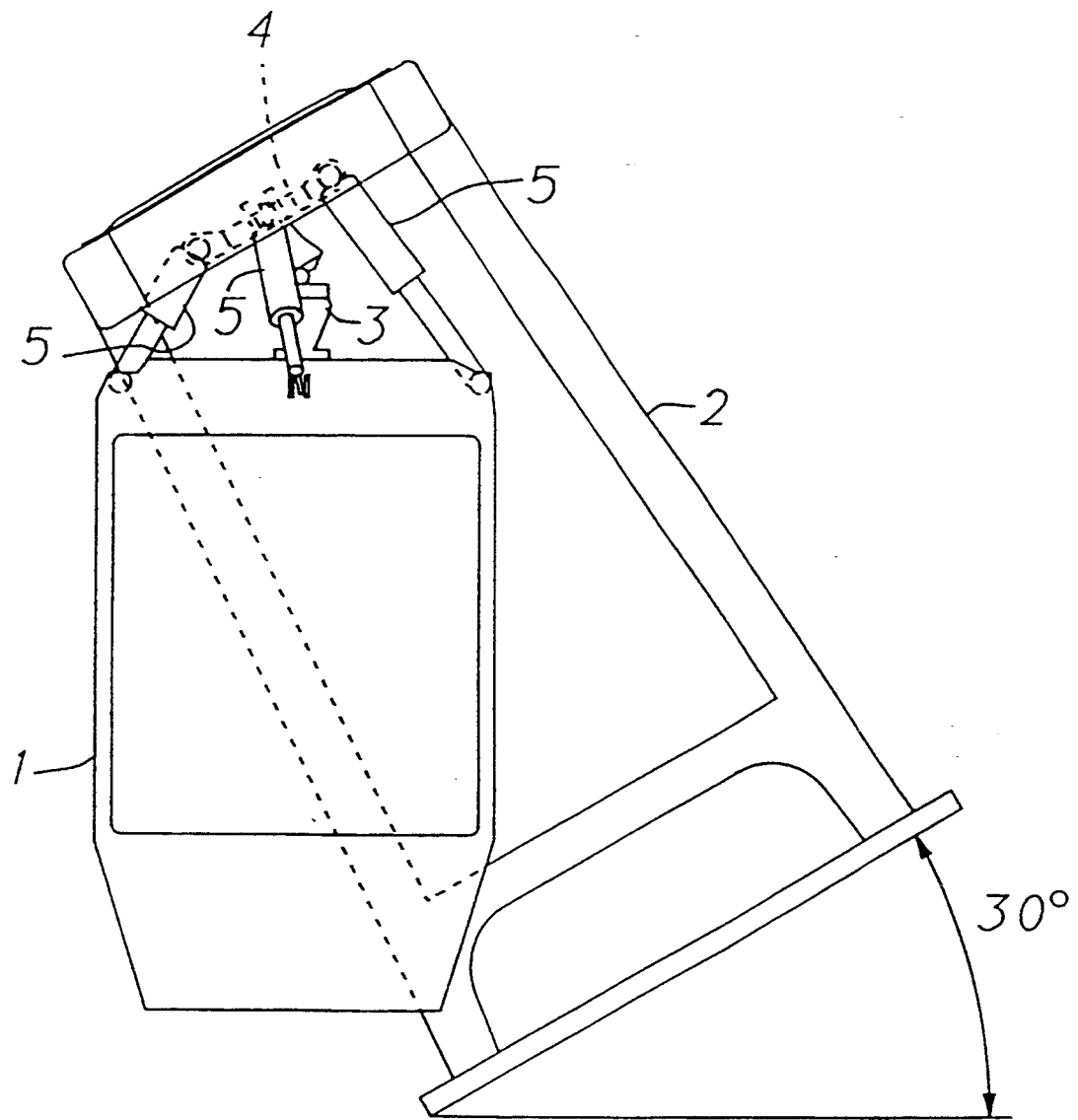
FIG. 3 illustrates the cabin when the vehicle inclines about its longitudinal axis, this angle being 30° in the illustrated case.

In the Figures, the reference numeral 1 identifies a cabin, for example the driving and operating cabin of a forest harvester, and 2 identifies a support device in the form of a cabin-carrying frame which, as shown in FIG. 2, is fixedly attached to the vehicle.

The cabin 1 the term "horizontal" being given such a meaning, in this context) is suspended from the carrier frame 2 by means of a carrier device 3 and when the cabin is manned and is located in the horizontal plane, the cabin will hang in a vertical line 8 which passes through the center of gravity of the cabin 1. The carrier device 3 includes a universal joint (for example a cardan joint), whereby the cabin is suspended so as to pendulate freely in relation to the vehicle and its chassis. The carrying device 3 is attached to the centre of a cruciform yoke 4 which, in turn, is attached to the carrier frame 2 by means of a carrier plate 9, via a vibration damping connection. The carrier device may be attached to the yoke 4 and to the cabin 1 by means of rubber springs, so as to prevent the transmission of vibrations and sound from the vehicle and its machines to the cabin. Four shock absorbers 5 are mounted in the upper edges of the cabin, centrally between its corners, by means of ball bearings mounted on the cabin 1. The other ends of respective shock absorbers 5 are also fixedly journalled by means of a ball bearing on respective arms of the yoke 4. The distances between the points at which the shock absorbers 5 are attached to the cabin 1 are greater than the distances between the points at which the shock absorbers are attached to the yoke 4, as illustrated in the Figures, which means that the shock absorbers will be inclined from the cabin roof, obliquely inwards and upwards. With a given constructional height of the support frame 2, this enables the use of shock absorbers 5 having greater lengths of working stroke than would otherwise be possible if the shock absorbers were arranged vertically. This inclination of the shock absorbers 5 also means that the yoke construction measurement is restricted, which enables the rotational range of the yoke in the case of a rotatable cabin, as described herebelow, to be kept relatively small.

The shock absorbers are preferably pneumatic piston-cylinder devices.

Because the cabin hangs in a vertical line which passes through its centre of gravity, there is no need to provide a complicated hydraulic piston-cylinder control system in order to keep the cabin level which, according to the present invention, adopts a horizontal position automatically, irrespective of the angle of the vehicle in the terrain. The shock absorbers 5 thus enable the cabin to pendulate without beginning to oscillate. Vibrations and slewing movements of the vehicle are effectively dampened by the shock absorbers.

The shock absorbers 5 may be arranged in a manner which will enable their damping characteristics to be adjusted from within the cabin, either individually and/or together. This enables the rate of damping to be controlled with respect to pendulation in the transverse and longitudinal directions and will also enable the rate of pendulation to be finely adjusted in accordance with varying ambient temperatures (winter–summer).

Figure 1:
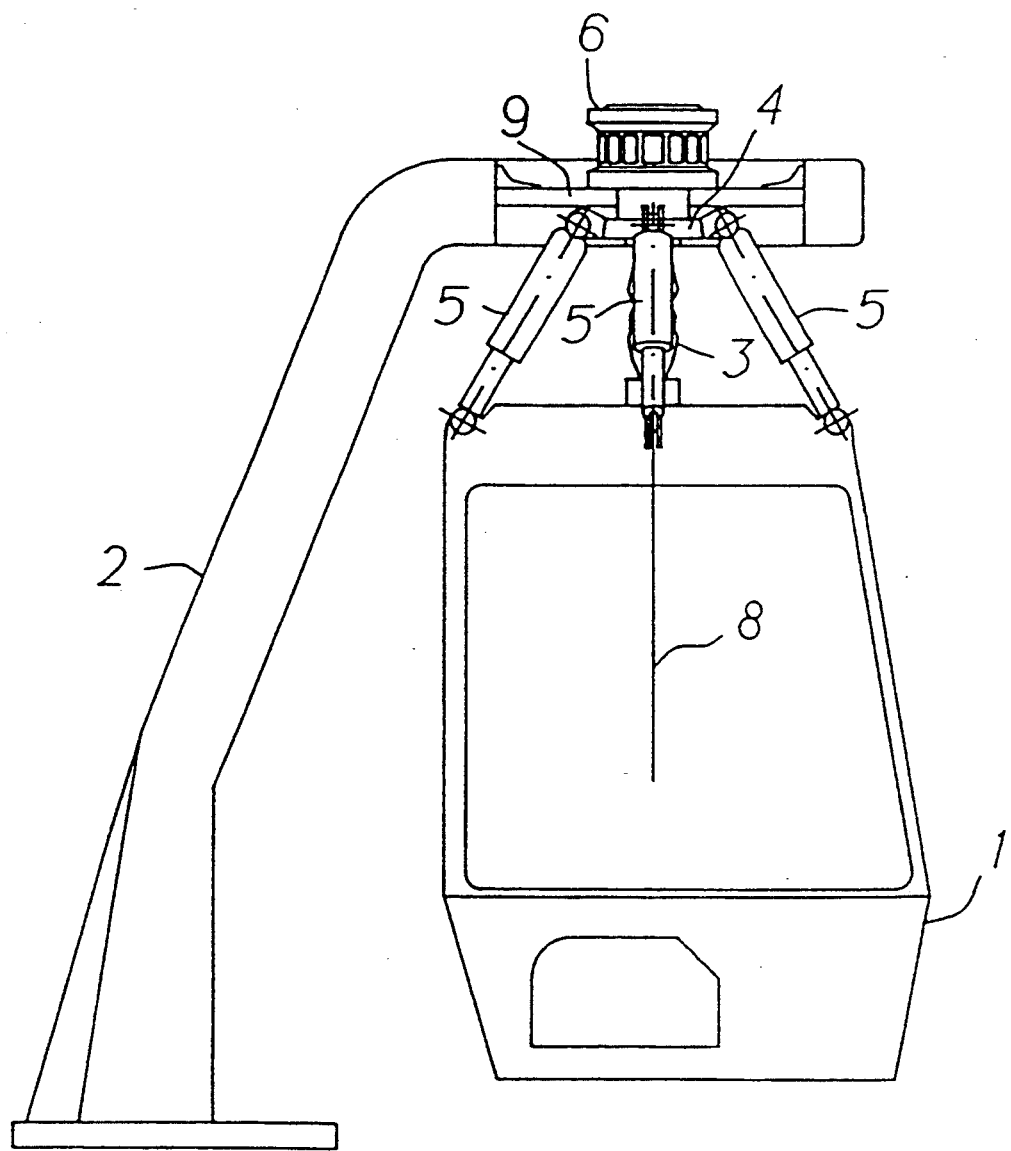
FIG. 1 is a schematic illustration of a cabin, for example the driver's cabin and operating cabin of a forest harvester.

In the case of the embodiment illustrated in FIG. 1, the cruciform yoke 4 is connected either to an electric or a hydraulic motor 6, by means of which the cabin 1 can be rotated in relation to the carrier frame 2 and therewith in relation to the vehicle chassis. When working, for example, with a crane, it is therefore not necessary for the driver to twist his or her head, since the driver is able either rotate the cabin 1 to the best position for carrying out the work concerned, or the motor 6 can be coupled to the crane arm or jib 7 (FIG. 2), so that the cabin will rotate synchronously with said arm or jib.

The aforesaid free suspension of the cabin minimizes the risk of damage to the cabin in the event of the vehicle toppling, or in the event of a tree falling onto the cabin or being brought into contact therewith due to error. The carrier frame 2 functions as a protective frame and may be given a form appropriate to this end.

Thus, the present invention provides for automatic levelling of the cabin without the need for a complicated control system, thereby greatly facilitating the work required of the driver, who is able to perform his work in greater safety and comfort than in the case of a driver who must constantly counteract impacts, jolts and rocking motion in conventional cabins.

I claim:

1. A cross-country vehicle for maneuvering over uneven terrain, comprising:
    a chassis supported for movement upon uneven terrain and including a cabin carrier frame for hangingly suspending an operator's cabin for the vehicle;
    an operator's cabin having a center for gravity;
    a universal joint suspending said cabin from above, from said carrier frame for omnidirectionally pendular swinging motion relative to a pivot point provided by said universal joint, so that said center of gravity of said operator's cabin tends to lie on an imaginary straight line connecting said pivot point with the center of the earth; and
    a plurality of two ended shock absorbers equiangularly spaced from one another about said line and each having one end effectively connected with said carrier frame and an opposite end effectively connected with said cabin, both with radial spacing from said line, for damping tendency of said cabin to omnidirectionally pendularly oscillate as said vehicle traverses uneven terrain.

2. The cross-country vehicle of claim 1, wherein:
    there are four said shock absorbers; said cabin has a top wall, and respective of said opposite ends of said shock absorbers are connected with said cabin at respective points on said top wall.

3. The cross-country vehicle of claim 2, wherein:
    said cabin is square in plan, so as to have four corners, and said respective points are located centrally between respective adjoining ones of said corners.

4. The cross-country vehicle of claim 1, wherein:
    said shock absorbers converge towards one another from said opposite ends towards said one ends thereof.

5. The cross-country vehicle of claim 1, wherein:
    said universal joint is provided on a motorized yoke mounted to said carrier frame;
    said one ends of said shock absorbers are effectively connected with said carrier frame by being pivotally connected to said yoke; and
    further including a motor, effectively mounted between the carrier frame and the universal joint for rotating said cabin around said line under control of an operator disposed in said cabin.

* * * * *